Jan. 11, 1944.  F. MALAGRINO  2,338,951
DEVICE FOR CUTTING THREADS SIDEWISE WITH AUTOMATICALLY WITHDRAWING TOOL
Filed July 11, 1941  2 Sheets-Sheet 1
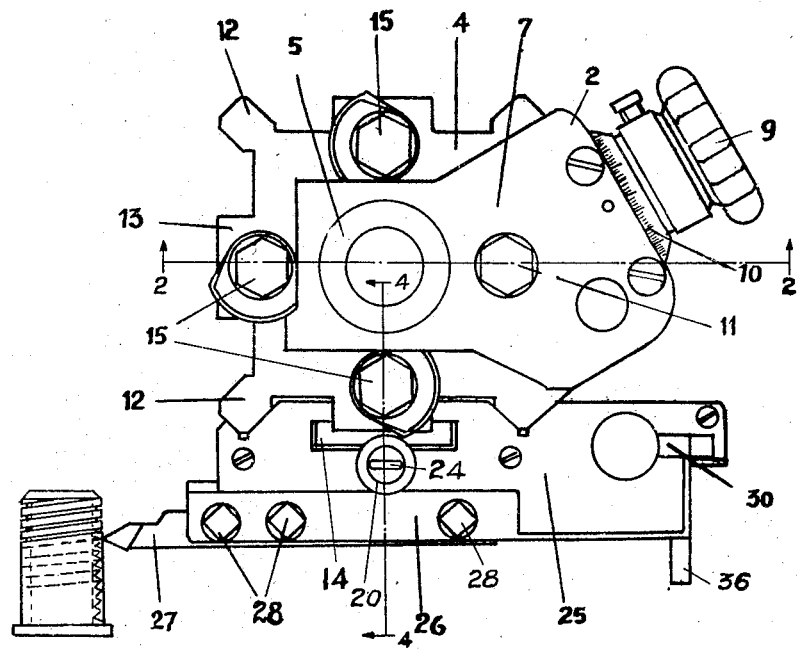
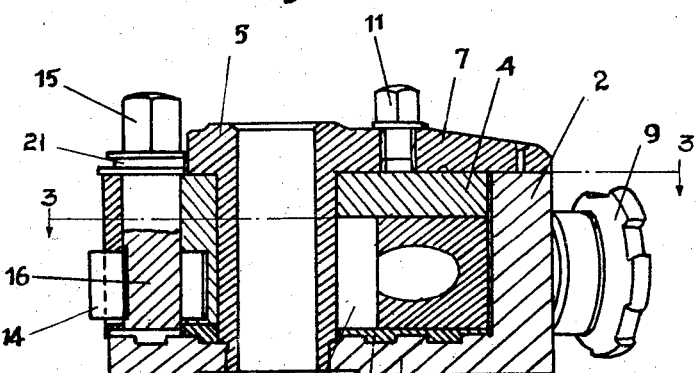
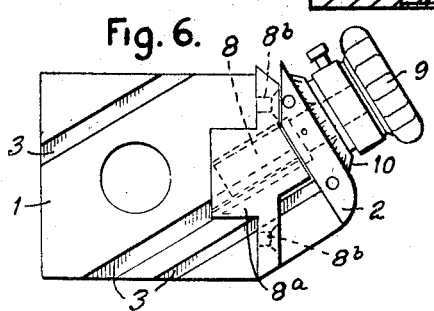
Inventor:
Francesco Malagrino
By: Stevens and Davis
Attys.

Jan. 11, 1944.   F. MALAGRINO   2,338,951
DEVICE FOR CUTTING THREADS SIDEWISE WITH AUTOMATICALLY WITHDRAWING TOOL
Filed July 11, 1941   2 Sheets-Sheet 2
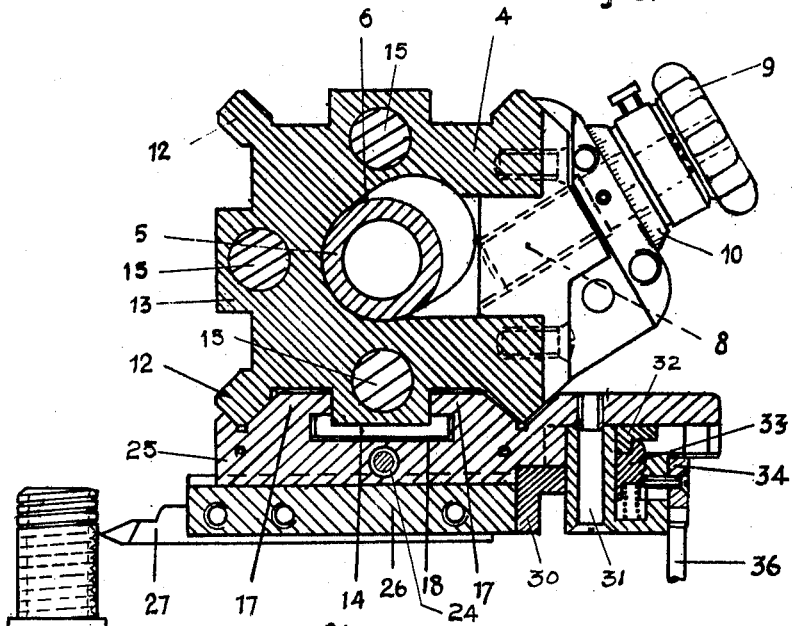
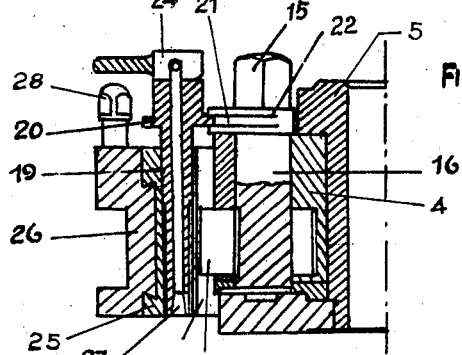
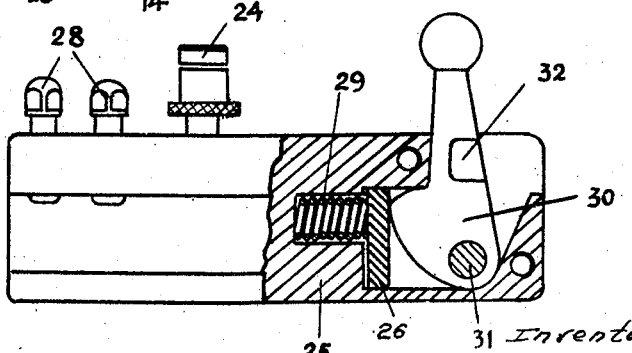
Inventor:
Francesco Malagrino
By: Stevens and Davis
Attys.

Patented Jan. 11, 1944

2,338,951

UNITED STATES PATENT OFFICE 2,338,951

DEVICE FOR CUTTING THREADS SIDEWISE WITH AUTOMATICALLY WITHDRAWING TOOL

Francesco Malagrino, Torino, Italy; vested in the Alien Property Custodian

Application July 11, 1941, Serial No. 402,042
In Italy December 7, 1940

4 Claims. (Cl. 10—101)

This invention has for its object a device which allows the ready and convenient cutting of either quadrangular or triangular threads on lathes. By said device the forming of quadrangular threads is improved by the fact that the tool is rapidly and automatically withdrawn from the piece of work after the cut, while, as it regards the triangular threads, the improvement is obtained by the fact that the tool works only on one side of the thread so that a greater quantity of material may be detached at each cut without peril of tool chatterings, wrenching of the threads being so avoided and the working speed being remarkably increased.

The device according to the present invention substantially consists in a turret comprising a base plate fixed to the lathe carriage and a prismatic block slidable on said plate in a direction oblique to the axis of the carriage feeding, for instance in a direction forming an angle of 60° with said axis. Said block is driven by means of a micrometric screw pivotally mounted in a little bracket of the base plate and it is guided by guide means adapted and arranged to assure its movement in the established direction.

The tool carrier unit is adjustably fixed to a side of the block or moving part of the turret so that it participates in this diagonal movement of said block to cause the tool to penetrate into the work piece for predetermined depths by the several cuts. Said carrier unit comprises a supporting piece fixed to the block and the tool carrier proper, which is able to longitudinally slide in a dovetail slot of the supporting piece. A spring disposed between both these parts tends to cause the tool carrier to return, the latter being maintained in the working position by means of a clamping tooth arranged to be brought into disengaging position by hand or by means of a stop or the like, with which a tappet device cooperates after the cut in such a manner that the tool is caused to snap to withdrawn position by freeing itself from the piece of work.

A form of execution of the device according to the invention is illustrated, only by way of example, on the accompanying drawings, in which:

Fig. 1 is a plan view of said device;

Fig. 2 is a vertical section taken substantially on line II—II of Fig. 1;

Fig. 3 is a horizontal section taken substantially on the broken line III—III of Fig. 2;

Fig. 4 is a detail vertical section taken substantially on line IV—IV of Fig. 1;

Fig. 5 is a side view of the tool carrier with parts broken away; and

Figure 6 is a detail plan view of the base plate with its integral flange and adjusting mechanism carried thereby.

With reference to the drawings, the reference numeral 1 indicates a base plate having at one end a flange 2 and provided on its upper surface with wide and shallow diagonal slots 3 in which engage corresponding ribs formed on the under face of a block 4 adapted to slide in diagonal direction on the base plate. This block is also guided by a sleeve 5 with vertical axis, which is fixed to the base plate, passes through a diagonal opening 6 in the block and presents at the top a lateral flange portion 7 fixed on the upper border of the flange 2 by means of screws. The base plate 1 and the flange portions 2 and 7 form thus a box within which slides the block 4 forming an adjustable turret designed to be mounted upon a horizontal lathe by means of a screw bolt passing through the sleeve 5.

The diagonal movement of the block or turret 4 is actuated by means of a micrometric screw 8 screwed to a removable threaded member 8a fixed, as by screws 8b, in a vertical groove formed in one vertical face of the turret. The screw 8 is mounted to rotate without possibility of axially moving in a supporting piece carried by the flange 2. Said screw is provided with a head having a knob 9, which carries a scale 10 moving in front of a fixed index. A clamping screw 11 serves to fix the turret in adjusted positions.

The pitch of the micrometric screw 8 is so chosen as to enable the operator to directly read on the scale 10 the substantial penetration at 90° of the tool 27 into the piece of work, that is to say said pitch is proportional to the trigonometrical functions of an equilateral triangle.

The other three vertical faces of the block 4 are wholly uncovered, and the tool carrier supporting unit may be mounted on any of them. To this end each of said faces presents slots with inclined side guide wands 12 and a wide central vertical rib 13 having a deep hollow within which a T-shaped latch 14 is slidably mounted, the movement of said latch being obtained by means of a bolt 15 having an eccentric portion 16 which engages in a hole of the latch. The tool carrier supporting unit has side projecting parts 17 with inclined faces and a central T-slot 18 which may be respectively brought into engagement with the inclined wands 12 by the latch 14, said tool carrier supporting unit being thus clamped in a regulated position by turning the bolt 15 so as to push by its eccentric portion 16, the latch inwardly and force the side projecting parts of the tool carrier supporting unit against the inclined wands 12 of the turret.

The exact centering of the tool carrier supporting unit is obtained by means of a screw 19 screwed in said unit and having at its upper portion a collar 20 engaging in a slot 21 formed in an eccentric collar 22 of the bolt 15. The screw 19 is hollow and it is made expansible by means of longitudinal slots. In said screw is disposed a pin movable axially, which has a conical head 23 engaging in a corresponding flaring of the apertured lower end of the screw 19, an eccentric lever 24 being pivotally mounted on the upper end of said pin. When said lever 24 is brought in horizontal position, it frees the expansible portion of the screw, which may then be rotated to vertically move the tool carrier supporting unit with respect to the turret, while when said lever is brought in vertical position, it causes the lower portion of the screw to expand in such a manner as to be clamped in its then position, the tool carrier supporting unit being thus fixed in a desired vertically adjusted position. To secure the tool carrier supporting unit in a new position, the screw 19 is first rotated, the knurled collar 20 of which, engaging in the slot 21 in the collar 22 of bolt 15, prevents axial screw movement and compels the tool carrier supporting unit to move vertically; when said unit has reached the desired adjusted position, it is clamped therein by means of the bolt 15 and the latch 14 actuated thereby.

The tool carrier supporting unit comprises a block 25 fixed to the turret 4 in the above described manner and having on its outer face a longitudinal dovetail slot within which the tool carrier 26 may axially slide, the tool 27 being mounted in said carrier 26 in the usual manner by means of the set screws 28.

The tool carrier 26 is subjected to the action of a spring 29, which tends to bring and maintain it in a withdrawn position, said carrier being able to be pushed outside in working position by means of a cam lever 30 pivotally mounted at 31 on the block 25 and having a notch 32 in which may engage a spring-pressed tooth 33 designed to maintain the tool carrier in working position.

The spring-pressed tooth 33 may be actuated by means of the lever 34 for freeing the cam lever 30 and thus allowing the tool carrier to be brought in inactive position by the action of the spring 29. Furthermore said tooth may be chamfered according to a suitable angle in order to gradually detach the tool from the bottom of the thread of the piece of work.

The lever 34 may be actuated either by hand or automatically by means of a tappet 36 adapted to cooperate at the end of each cut with a stop fixed to the lathe, to the end of removing the tool from the work piece and bringing again the turret into the initial position.

The form and the particulars of construction of the device may, of course, vary in any manner according to the exigences of the practical employ without coming out from the frame of the present invention.

What I claim is:

1. A thread cutting tool adapted for use with a lathe having stock supports for rotating stock and a carriage movable in timed relation thereto in a direction parallel to the axis of rotation of the stock supports comprising; a base plate adapted for attachment to the lathe carriage, said base plate being formed with a guideway disposed obliquely to the direction of movement of the carriage; a prismatic block slidable in said guideway; thread cutting means carried by said prismatic block, extending therefrom in a direction normal to the axis of the stock supports and adapted to be held in cutting position thereby; and means for adjusting the position of the prismatic block relatively to its supporting base plate, whereby the thread cutting means may be disposed in different cutting positions by movement with said block in a direction oblique to the axis of rotation of the stock to be threaded.

2. A thread cutting tool adapted for use with a lathe having stock supports for rotating stock and a carriage movable in timed relation thereto in a direction parallel to the axis of rotation of the stock supports comprising; a base plate adapted for attachment to the lathe carriage, said base plate being formed with a guideway disposed obliquely to the direction of movement of the carriage; a prismatic block slidable in said guideway, said block also having a guideway therein; thread cutting means mounted for sliding movement in said block guideway along an axis normal to the axis of the stock supports to and from projected position; means normally urging retraction of said cutting means from projected thread cutting position; means for sliding said cutting means to and holding it in such projected position; and means for adjusting the position of the prismatic block including the cutting means carried thereby relatively to the base plate to determine the character of the thread to be made when the cutting means is projected from the prismatic block, whereby a series of like thread cutting operations may be performed by once positioning the prismatic block and thereafter repeatedly retracting and projecting the cutting means upon the threading of each unit.

3. A thread cutting tool as claimed in claim 2, further comprising; means responsive to a predetermined movement on the part of the carriage for rendering inoperative the means for holding the cutting means in projected position and freeing said cutting means for retraction by said retracting means after cutting a threaded zone of predetermined length.

4. A thread cutting tool adapted for use with a lathe having stock supports for rotating stock and a carriage movable in timed relation thereto in a direction parallel to the axis of rotation of the stock supports comprising; a base plate adapted for attachment to the lathe carriage, said base plate being formed with a guideway disposed obliquely to the direction of movement of the carriage; a prismatic block slidable in said guideway; thread cutting means carried by said prismatic block, extending therefrom in a direction normal to the axis of the stock supports and adapted to be held in cutting position thereby; and a calibrated micrometer screw for adjusting the position of the prismatic block relatively to its supporting base plate, said screw causing movement along said guideway of said block and thread cutting means carried thereby, the calibrations being readable in terms of penetration at a right angle to the axis of rotation of the stock.

FRANCESCO MALAGRINO.